Patented Dec. 25, 1928.

1,696,645

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

CATALYTIC AND ADSORBENT GEL.

No Drawing. Original application filed February 28, 1920, Serial No. 362,138. Divided and this application filed March 15, 1926. Serial No. 94,960.

The present invention, which is a division of my application Serial No. 362,138 filed February 28, 1920, relates to adsorbent gels having chemically active or catalytic agents associated therewith, and more particularly to such gels having a nickel bearing material associated therewith.

In my Patent No. 1,297,724 I have disclosed the method of making a hard, highly porous silica gel, stable up to 700° C. and having ultra-microscopic pores.

It is the principal object of the present invention to produce gels similar in physical structure to the gel described in the above patent, but which possess special properties due to the incorporation of a nickel bearing material, for example, nickel oxide.

The present invention comprehends a hard, stable, porous material having ultra-microscopic pores substantially the same as the silica gel mentioned above, and having associated therewith a nickel bearing material.

From a chemical standpoint, it is very desirable to have certain substances in a physical structure similar to that of a porous gel such as the silica gel described in said patent. Silica is an inert substance chemically, and for this reason is admirably suited for adsorbing and removing gases and vapors, provided, of course, that it has the proper porous structure. On the other hand, other substances, such as nickel and nickel oxide, are known to possess desirable chemical and catalytic properties. If this metal or metallic oxide can be obtained with a structure similar to that of the gel described in the patent, the above properties are enhanced and made more active, because of the large surface presented. According to the present invention it is possible to obtain a gel of the structure disclosed in the patent having a nickel bearing material, such as nickel or nickel oxide, incorporated therewith.

In the preparation of silica gel as described in the patent, use is made of the reaction between a soluble silicate and an acid to produce colloidal silicic acid. It is found necessary to allow the silicic acid to set to a hydrogel in a medium of certain definite acid concentration, in order to insure a gel of the proper structure. The concentration of the acid in the mixture is from about three tenths to nine tenths gram ions of hydrogen per litre, the preferred concentration being about five tenths gram ions of hydrogen per litre.

If a mixture of nickel chloride, water glass and hydrochloric acid be prepared of such a nature that the whole will set to a hydrogel, it is found that it is possible to entirely free the mixture of chloride by washing without loss of much nickel. The loss of nickel in the washing depends upon the amount of acid used in the original mixture.

If improper proportions are taken, a precipitate will result and the product of the present invention not be obtained. On the other hand, if the proper proportions and quantities are taken, the mixture gradually hardens into a hydrogel. The hydrogel by washing and drying is converted into the highly porous gel of the present invention. The precipitate mentioned above, after being washed and dried, may be the same, chemically, as the gel, but it does not have the same porous structure. The gel has much finer pores than the dried precipitate, and consequently the internal surface of the gel is many times as extensive as the internal surface of the dried precipitate. It is because of this extensive surface that the gel of the present invention is so active catalytically.

In preparing the gels, the liquid after mixing should have an acid concentration of three tenths to nine tenths gram ions of hydrogen per litre. The product obtained after washing and drying is a hard glassy material having a porous structure substantially the same as silica gel and consisting of a colloidal oxide, and nickel oxide or nickel.

It is easily possible to reduce a mixture of the silica and nickel oxide and in this way obtain a mixture of silica and finely divided nickel, the whole possessing a structure analogous to silica gel. The nickel oxide may be reduced to finely divided nickel with hydrogen at a low temperature.

From the foregoing, it is apparent that according to the present invention it is possible to obtain hard, adsorbent gels including nickel or nickel oxide, this mixture being secured from a nickel salt, a silicate and acid, the proportions and concentrations being such as to give an acid concentration of three tenths to nine tenths gram ions of hydrogen per litre, in the liquid obtained by mixing solutions of the ingredients, The term "silica gel" as used in the specification and claims, designates a hard, porous material having a porous structure similar to that of the silica gel obtained by the process described in Patent No. 1,297,724.

The term "nickel bearing material" as used in the specification and claims is intended to designate the metal nickel by itself as well as compounds thereof.

Having thus described the invention, what is claimed as new and desired to be secured by Letters Patent is:

1. A hard stable material having a porous structure substantially the same as silica gel and consisting of a colloidal oxide and nickel.

2. A hard stable non-precipitated silica gel having ultra-microscopic pores and having nickel associated therewith.

3. A hard stable material having a porous structure substantially the same as silica gel and consisting of a colloidal oxide and a nickel bearing material.

4. A hard stable non-precipitated silica gel having ultra-microscopic pores and having a nickel bearing material associated therewith.

In testimony whereof I hereunto affix my signature.

WALTER A. PATRICK.